United States Patent [19]

Fukushima et al.

[11] Patent Number: 5,052,776
[45] Date of Patent: Oct. 1, 1991

[54] OPTICAL WAVEGUIDE AND AN IMAGE SENSOR USING THE SAME

[75] Inventors: Tetsuo Fukushima, Osaka; Kenichiro Suetsugu, Hyogo; Munekazu Nishihara, Osaka; Junji Ikeda, Nara, all of Japan

[73] Assignee: Matsushita Electric Industrial Co., Ltd., Osaka, Japan

[21] Appl. No.: 512,702

[22] Filed: Apr. 23, 1990

[30] Foreign Application Priority Data

Apr. 24, 1989 [JP] Japan .................................. 1-103890

[51] Int. Cl.⁵ .......................... G02B 6/08; H01J 40/14; G03B 27/00
[52] U.S. Cl. .................................. 385/120; 250/208.1; 355/1; 385/116
[58] Field of Search .......................... 350/96.24, 96.27; 250/208.1, 578.1; 355/1

[56] References Cited

U.S. PATENT DOCUMENTS

| 3,703,660 | 11/1972 | Fyler | 350/96.27 |
| 3,797,910 | 3/1974 | Westwig | 350/96.27 |
| 4,671,612 | 6/1987 | Sakurai et al. | 350/96.27 |

FOREIGN PATENT DOCUMENTS 0205104  8/1989  Japan ................................ 350/96.27

Primary Examiner—Akm Ullah
Attorney, Agent, or Firm—Panitch, Schwarze, Jacobs & Nadel

[57] ABSTRACT

An optical waveguide and an image sensor using the same, the optical waveguide comprising a plurality of bar-shaped cores that are aligned in a proper manner, the cores being made of transparent materials with a large refractive index, and a cladding that is disposed around the cores, the cladding being made of materials with a small refractive index that are capable of absorbing or scattering light, wherein part of each of said cores on which irradiated light is incident is uncovered, or part of said cladding on which irradiated light is incident is transparent.

4 Claims, 3 Drawing Sheets

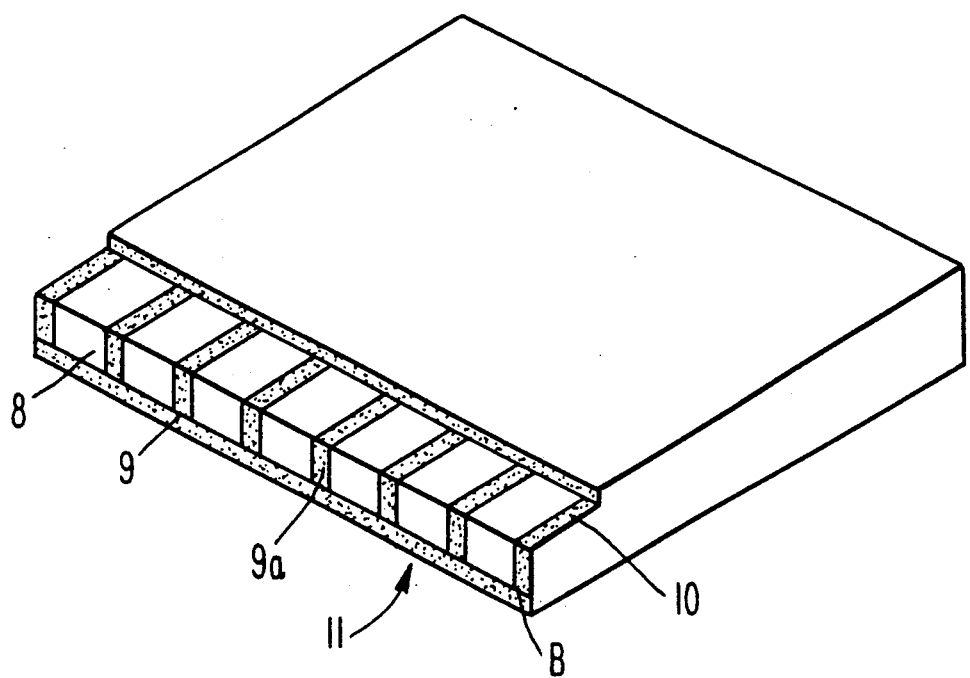
_Fig. 1_
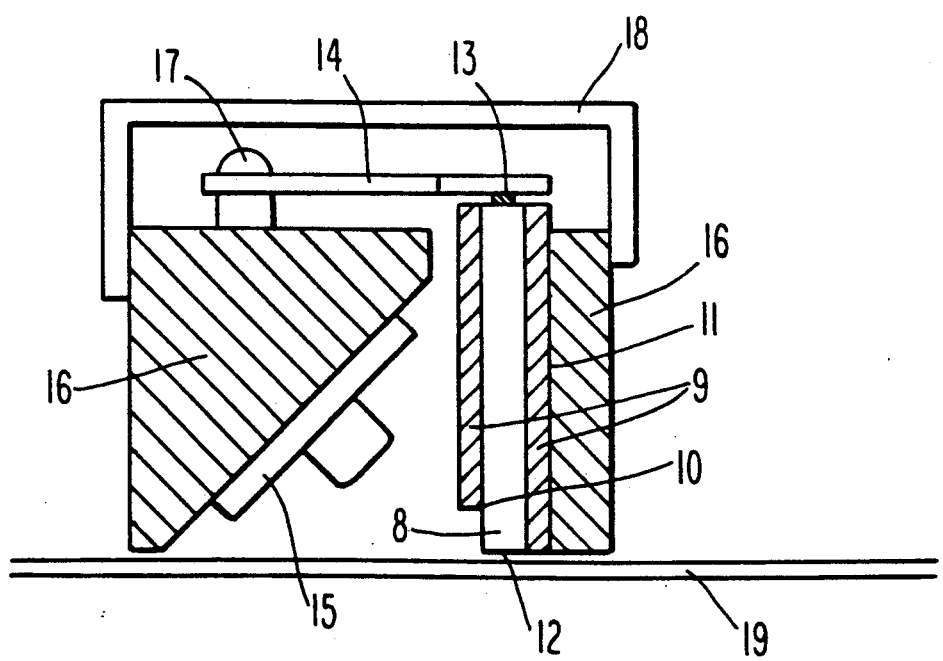
_Fig. 2_

OPTICAL WAVEGUIDE AND AN IMAGE SENSOR USING THE SAME

BACKGROUND OF THE INVENTION

1. Field of the invention:

The present invention relates to an equal waveguide used in an image sensor of a facsimile and an image sensor using the same.

2. Description of the prior art:

Conventional optical systems used for an image input process in a facsimile employ a distributed index lens array (e.g., SELFOC LENS ARRAY (SLA); trade name), an optical fiber array, or the like. The optical system employing the distributed index lens array is expensive because of its complicated production process, and that employing the optical fiber array has problems in its illumination process or the like.

Now, referring to FIGS. 5, 6, and 7, description will be given for the conventional optical system employing an optical fiber array used for an image input process. FIG. 5 shows a conventional fiber sheet used as the optical system which comprises cores 1, claddings 2, and absorbing layers 3. In this fiber sheet, although the absorbing layers 3 prevent interfering light or leakage light from deteriorating resolution or contrast of an image of an original, complicated process for arranging fibers in a proper manner leads to an increase in cost.

FIG. 6 shows another conventional fiber sheet which has been proposed in order to decrease the cost of the conventional fiber sheet of FIG. 5 (see, Japanese Laid-open Patent Publication No. 54-88143). The fiber sheet of FIG. 6 comprises cores 4, claddings 5 and scattering elements 6. This fiber sheet is produced in such a manner that a photo mask is disposed on a macromolecular film sheet impregnated with polymeric monomers, which is exposed to light or irradiated by an electron beam, or scanned with light or an electron beam irradiated from an array of optical sources generating a point irradiation beam, so that monomers are selectively polymerized and then unreacted monomers are removed. In this process, a lot of scattering elements 6 are produced within the claddings 5 by control of the polymerization conditions, heat treatment or the like. Therefore, the fiber sheet of FIG. 6 can be produced at relatively low cost and deterioration in resolution or contrast of the image by the interfering light or the leakage light can be avoided.

However, in the fiber sheet having above-discussed construction of FIG. 6, incident light on a side A of each core 4 is directed to a side B while performing total reflection within the cores 4, without leaking out in a direction shown by an arrow X. However, since the light leaks out in a direction shown by an arrow Z, transmission efficiency may be reduced. In order to improve the transmission efficiency, cladding layers 5a and 5b are required to be formed on the upper and lower surfaces of the fiber sheet, respectively, as shown in FIG. 7. However, on the cladding layers 5a and 5b, light-shielding layers for shielding the interfering light (i.e., external light and light from a light source) must be disposed, which results in that the incident light can hardly reach the surface of an original.

SUMMARY OF THE INVENTION

The optical waveguid of the present invention, which overcomes the above-discussed and numerous other disadvantages and deficiencies of the prior art, comprises a plurality of bar-shaped cores that are aligned in a proper manner, said cores being made of transparent materials with a large refractive index, and a cladding that is disposed around said cores, said cladding being made of materials with a small refractive index that are capable of absorbing or scattering light, wherein part of each of said cores on which irradiated light is incident is uncovered.

Alternatively, the optical waveguide of the present invention comprises a plurality of bar-shaped cores that are aligned in a proper manner, said cores being made of transparent materials with a large refractive index, and a cladding that is disposed around said cores, said cladding being made of materials with a small refractive index that are capable of absorbing or scattering light, wherein part of said cladding on which irradiated light is incident is transparent.

The image sensor using the optical waveguide of the present invention comprises a light emitting diode array, said array being provided so that light irradiated therefrom enters said cores through an uncovered part of each of said cores, and illuminates an original disposed right under an end of said optical waveguide on which the light reflected from said original is incident; and a photoelectric conversion sensor which receives the light reflected from said original, said photoelectric conversion sensor being disposed on the other end of said optical waveguide opposite to said end on which the light reflected from said original is incident.

Alternatively, the image sensor using the optical waveguide of the present invention comprises a light emitting diode array, said array being provided so that light irradiated therefrom enters said cores through a transparent part of said cladding, and illuminates an original disposed right under an end of said optical waveguid on which the light reflected from said sensor is incident; and a photoelectric conversion sensor which receives the light reflected from said original, said photoelectric conversion sensor being disposed on the other end of said optical waveguide opposite to said end on which the light reflected from said original is incident.

Thus, the invention described herein makes possible the objectives of (1) providing an optical waveguide which enables an original to be sufficiently illuminated with hight transmission efficiency and prevents resolution or contrast of an image of the original from being deteriorated by interfering light and/or leakage light; (2) providing an optical waveguide which can be produced at low cost; (3) providing an optical waveguide which has an improved reliability; and (4) providing an image sensor which has the above-mentioned optical waveguide.

BRIEF DESCRIPTION OF THE DRAWINGS

This invention may be better understood and its numerous objects and advantages will become apparent to those skilled in the art by reference to the accompanying drawings as follows:

FIG. 1 is a perspective view showing an optical waveguide of the present invention.

FIG. 2 is a sectional view showing an image sensor to which the optical waveguide of FIG. 1 is applied.

DESCRIPTION OF THE PREFERRED EMBODIMENTS

EXAMPLE 1

Figure 3:
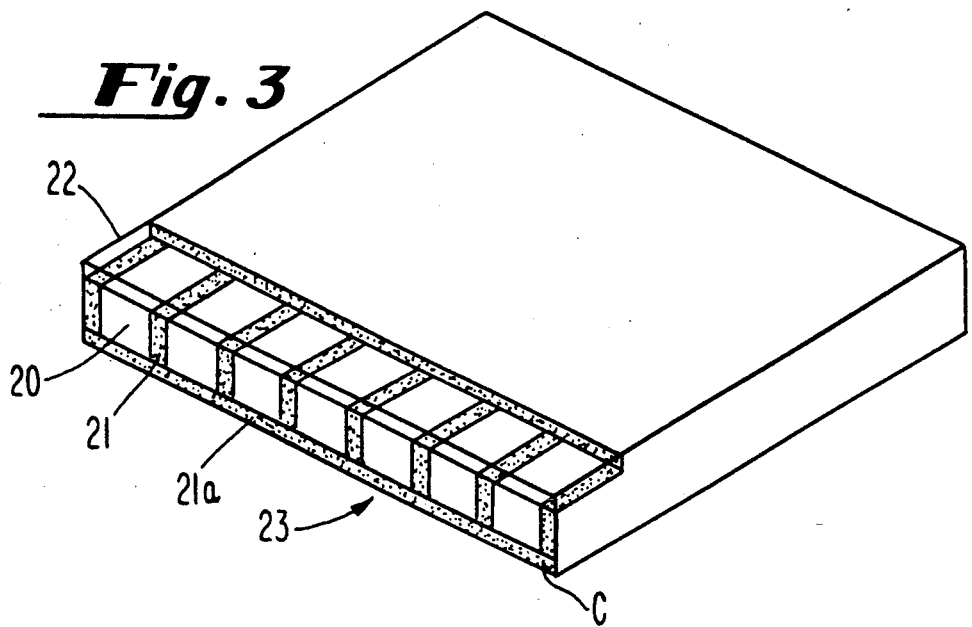
FIG. 3 is a perspective view showing another optical waveguide of the present invention.

Referring to FIGS. 1 and 2, one embodiment of the present invention will be described below. FIG. 1 shows an optical waveguide 11 of the present invention, which comprises a plurality of bar-shaped cores 8, a cladding 9 provided around the cores 8, and absorbing or scattering elements 9a distributed in the cladding 9. Since part of each core 8 is not covered with the cladding 9 due to a cutout 10, light can directly enter the cores so as to illuminate an original disposed right under a side B of the optical waveguide 11.

FIG. 2 shows an image sensor unit in which the optical waveguide 11 of FIG. 1 is incorporated as an optical system. The image sensor unit of FIG. 2 comprises an optical waveguide 11, a photoelectric conversion sensor 13, a sensor circuit substrate 14, a light emitting diode (LED) array 15, a base 16, a screw 17 for fixing the substrate 14, and a light-shielding cover 18. An original 19 is disposed right under an end 12 of the optical waveguide 11 on which light reflected from the original 19 is incident.

When this image sensor is used for reading an image of the original 19, light (not shown) from the LED array 15 directly enters the cores 8 from the uncovered part of each core without being disturbed by the cladding 9 and illuminates the original 19 disposed right under the end 12 of the optical waveguide 11. The light reflected from the original 19 enters the cores 8 again from the end 12 of the optical waveguide 11 and is guided to the photoelectric conversion sensor 13 while repeating total reflection within the cores 8. In this way, information of the original 19 is transmitted to the photoelectric conversion sensor 13. Since the absorbing or scattering elements 9a (shown in FIG. 1) of the cladding 9 prevent the interfering light or leakage light from entering the cores 8, a proper image can be transmitted without reducing resolution or contrast of the image.

As mentioned above, according to the present embodiment, a plurality of bar-shaped cores 8 made of transparent materials having a large refractive index are aligned in a proper manner, around which is disposed the cladding 9 made of materials having a small refractive index that are capable of absorbing or scattering the light, and part of the surface of each core 8, on which the irradiated light is incident, is not covered with the cladding 9 due to the cutout 10. Therefore, the irradiated light can enter the cores 8 from its uncovered part and the original 19 can be sufficiently illuminated without being disturbed by the cladding 9. Moreover, due to the absorbing or scattering elements 9a, a proper image can be transmitted without causing deterioration in resolution or contrast of the image by interfering light and/or leakage light.

EXAMPLE 2

Next, explanation will be given on another embodiment of the present invention with reference to FIGS. 3 and 4. FIG. 3 shows an optical waveguide 23 of this embodiment which comprises a plurality of bar-shaped cores 20, a cladding 21 provided around the cores 20, absorbing or scattering elements 21a distributed within the cladding 21, and a transparent cladding 22. Due to the transparent cladding 22 which is made of transparent resin, irradiated light can pass therethrough and enter the cores 20 so as to illuminate an original disposed right under a side C of the optical waveguide 23.

Figure 4:
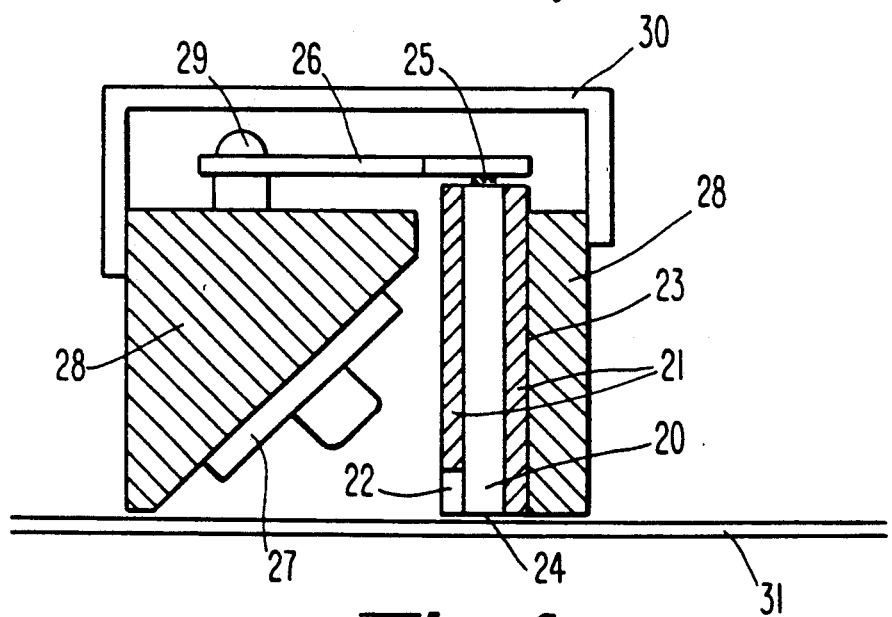
FIG. 4 is a sectional view showing an image sensor of the invention to which the optical waveguide of FIG. 3 is applied.
Figure 5:
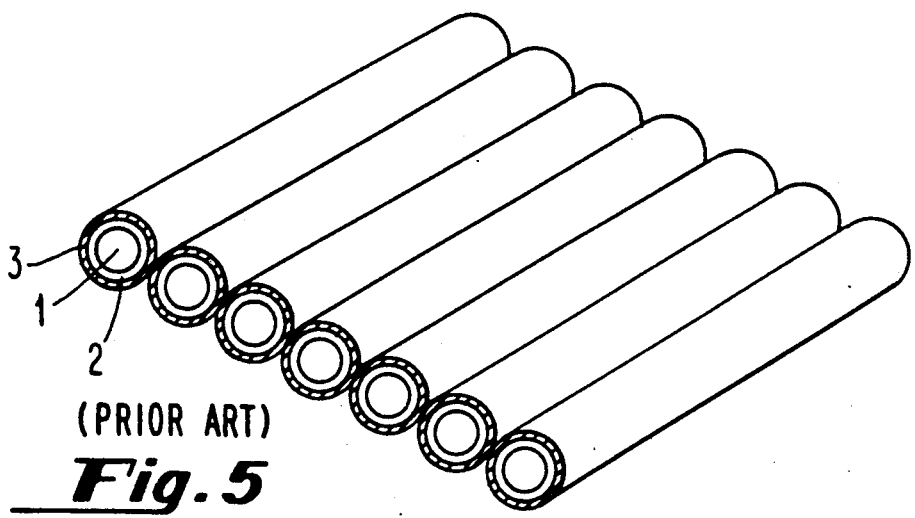
FIG. 5 is a perspective view showing an conventional optical fiber sheet.
Figure 6:
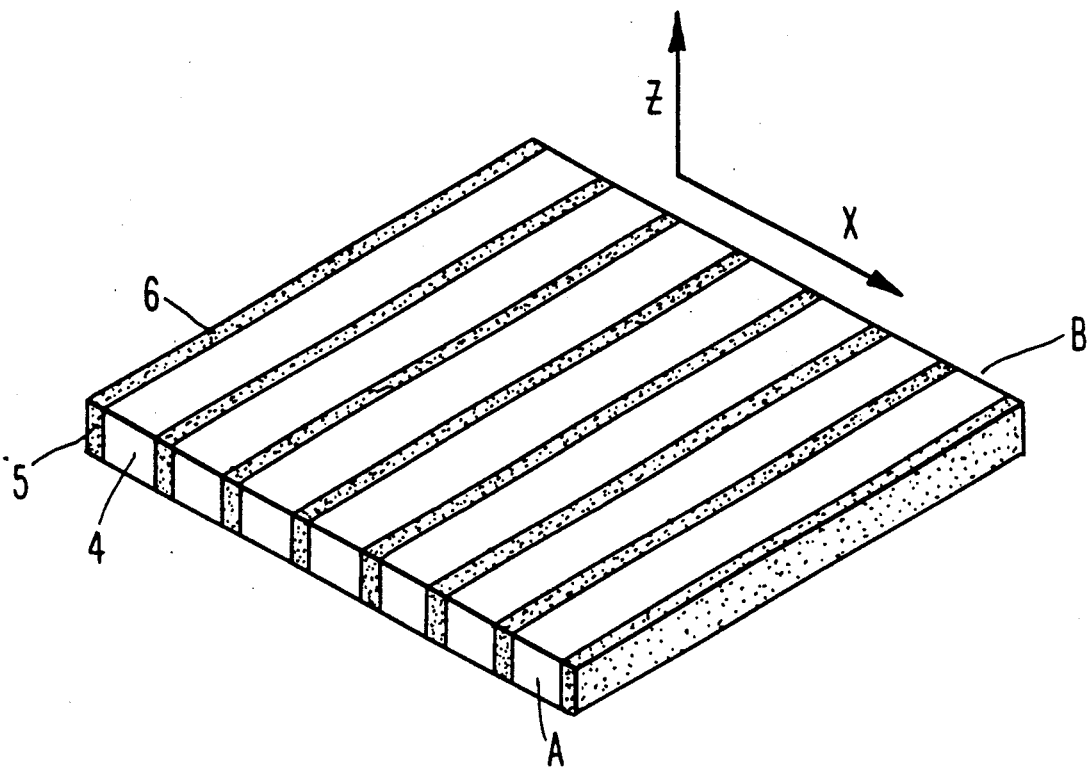
FIGS. 6 and 7 are perspective views showing conventional macromolecular optical fiber sheets, respectively.
Figure 7:
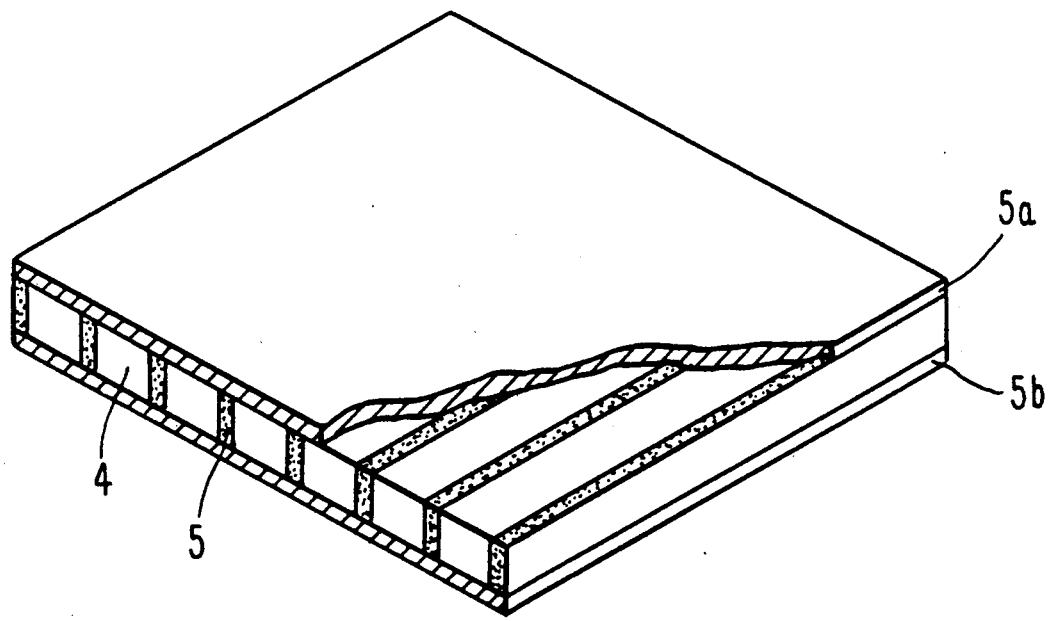

FIG. 4 shows an image sensor unit in which the optical waveguide 23 of FIG. 3 is incorporated as an optical system. The image sensor unit of FIG. 4 comprises an optical waveguide 23, a photoelectric conversion sensor 25, a sensor circuit substrate 26, an LED array 27, a base 28, a screw 29 for fixing the substrate 26, and a light-shielding cover 30. An original 31 is disposed right uner an end 24 of the optical waveguide 23 on which the light reflected from the original 31 is incident.

When this image sensor is used for reading the image of the original 31, light (not shown) from the LED array 27 enters the cores 20 through the transparent cladding 22 and illuminates the original 31 disposed right under the end 24 of the optical waveguide 23. The light reflected from the original 31 enters the cores 20 again from the end 24 of the optical waveguide, and is guided to the photoelectric conversion sensor 25 while repeating total reflection within the cores 20. In this way, information of the original 31 is transmitted to the photoelectric conversion sensor 25. Since the the absorbing or scattering elements 21a distributed within the cladding 21 prevent the interfering light or leakage light from entering the cores 20, a proper image can be transmitted without deterioration in resolution or contrast of the image.

As mentioned above, according to the present embodiment, a plurality of bar-shaped cores 20 made of transparent materials having large refractive index are aligned in a proper manner, around which is disposed the cladding 21 made of materials having small refractive index that are capable of absorbing or scattering the light. Since part of the cladding 21 in the vicinity of the end 24 of the optical waveguide 23 on which the irradiated light is incident is the transparent cladding 22, the original 31 can be sufficiently illuminated. Moreover, due to the absorbing or scattering elements 21a, a proper image can be transmitted without causing deterioration in resolution or contrast of the image by the interfering light and/or leakage light. Furthermore, in this embodiment, since only the end 24 of the optical waveguide 23 at the original side end the other end of the optical waveguide 23 at the photoelectric conversion sensor side are uncovered, the reliability of the image sensor is much improved.

In the above-discussed embodiments, if the end of each core of the optical waveguide is in contact with the original, the cores may be worn off. In order to avoid the cores wearing off, a hard coat, micro sheet glass or the like may be applied to the end of each core which comes into contact with the original.

As materials for the core, for example, polycarbonate, epoxy resin, acrylic resin, glass or the like can be used. As materials for the cladding, polycarbonate, epoxy resin, acrylic resin or glass having a smaller refractive index than the cores can be employed. As materials for the absorbing or scattering elements, for example, inorganic pigments such as carbon black, glass beads, or the like can be used. A certain amount of these materials is added to the cladding before the cladding is hardened (i.e., when the cladding is liquid), and mixed together, resulting in a cladding including therein the absorbing or scattering elements. Alternatively, the absorbing or scattering elements of the cladding may be formed by mixing various kinds of absorbing or scattering elements or by clouding the materials by controlling the polymetric reaction.

As mentioned above, according to the present invention, a plurality of bar-shaped cores made of transparent materials having a large refractive index are aligned in a proper manner, around which is disposed the cladding made of materials having a small refractive index that are capable of absorbing or scattering the light. Since part of the optical waveguide on which the irradiated light is incident is uncovered or transparent, the original can be sufficiently illuminated. Moreover, due to the absorbing or scattering elements in the cladding, a proper image can be transmitted without being disturbed by the interfering light or leakage light which deteriorates resolution or contrast of the image.

Furthermore, when the transparent cladding is employed, since only the end of the optical waveguide at the original side and the other end of the optical waveguide at the photoelectric sensor side are not covered with the cladding, the reliability of an image sensor can be more improved.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical waveguide comprising a plurality of aligned bar-shaped cores, said cores being made of transparent materials with a large refractive index, and a cladding that is disposed around a portion of said cores, said cladding being made of materials with a small refractive index capable of absorbing or scattering light, wherein part of each of said cores on which irradiated light is incident is uncovered.

2. An image sensor using the optical waveguide of claim 1, which comprises a light emitting diode array, said array being provided so that light irradiated therefrom enters said cores through an uncovered part of each of said cores, and illuminates an original disposed under an end of said optical waveguide on which the light reflected from said original is incident; and a photoelectric conversion sensor which receives the light reflected from said original, said photoelectric conversion sensor being disposed on the other end of said optical waveguide opposite to said end on which the light reflected from said original is incident.

3. An optical waveguide comprising a plurality of aligned, bar-shaped cores, said cores being made of transparent materials with a large refractive index, and a first cladding that is disposed around a portion of said cores, said cladding being made of materials with a small refractive index capable of absorbing or scattering light, wherein part of each of said cores on which irradiated light in incident is covered by a second, generally transparent cladding.

4. An image sensor using the optical waveguide of claim 3, which comprises a light emitting diode array, said array being provided so that light irradiated therefrom enters said cores through the second, generally transparent cladding, and illuminates an original disposed under an end of said optical waveguide on which the light reflected from said original is incident; and a photoelectric conversion sensor which receives the light reflected from said original, said photoelectric conversion sensor being disposed on the other end of said optical waveguide opposite to said end on which the light reflected from said original is incident.

* * * * *